F. KALTENBACH.
NON-SKIDDING DEVICE AND CLIMBER FOR AUTOMOBILES.
APPLICATION FILED NOV. 15, 1909.

952,813.

Patented Mar. 22, 1910.

WITNESSES:
C. H. Bills.
E. E. Thomas.

INVENTOR.
Frank Kaltenbach,
By Owen & Owen,
His attys.

UNITED STATES PATENT OFFICE.

FRANK KALTENBACH, OF EDON, OHIO, ASSIGNOR OF ONE-HALF TO ELLSWORTH F. BRANDON, OF EDON, OHIO.

NON-SKIDDING DEVICE AND CLIMBER FOR AUTOMOBILES.

952,813.

Specification of Letters Patent. Patented Mar. 22, 1910.

Application filed November 15, 1909. Serial No. 527,989.

*To all whom it may concern:*

Be it known that I, FRANK KALTENBACH, a citizen of the United States, and a resident of Edon, in the county of Williams and State of Ohio, have invented a certain new and useful Non-Skidding Device and Climber for Automobiles; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means for use particularly in connection with automobile wheels for preventing a slipping or skidding of such wheels when traveling over slippery surfaces or when ascending or descending inclines.

The object of my invention is the provision of a simple and improved device of this character, which is inexpensive to manufacture, strong and durable in its construction, and highly efficient in its operation, and which is provided with noise deadening means whereby the noise incident to the device striking the surface over which the vehicle is running is reduced to a minimum.

The operation, construction, and arrangement of the parts of my invention are fully described in the following specification, and while the invention in its broader aspect is susceptible of numerous modifications, a preferred embodiment of the same is illustrated in the accompanying drawings, in which,—

Figure 1 is a side elevation of a portion of a wheel equipped with my invention. Fig. 2 is an enlarged cross-section thereof on the line $x\ x$ in Fig. 1. Fig. 3 is an enlarged side elevation of the bar comprising my invention with the ends thereof as they appear at different stages of the shaping process. Fig. 4 is a plan view of the same in its completed state, and Figs. 5 and 6 are sectional views of such bar on the lines $y\ y$ and $w$ and $w$, respectively in Fig. 4.

Referring to the drawings, 1 designates an oblong bar or gripping-shoe of steel or other suitable material, which is intended to be secured on the tread of a tire transversely thereof, as shown. This bar comprises the body portion 2 having a straight outer surface and a longitudinally concaved inner surface adapted to seat on the tread of the tire 3 of a wheel. The straight outer side of the body 2 is provided near each end with a recess or cavity 4, and at the edges thereof at each side of such recesses with outwardly projecting lips or lugs 5 for the purpose hereinafter described.

Extending longitudinally from the inner portion of each end of the body 2 is a reduced neck or shank 6, which terminates in a block 7. These blocks have their outer and inner surfaces flat and the outer surfaces thereof terminate at their ends in abrupt shoulders 8, as shown. The shanks 6 are intended to be bent outwardly to coöperate with the ends of the body 2 to form eyes 9 for receiving a link of a chain or other suitable securing means 10, and to permit the blocks 7 to rest flat on the end portions of the body over the recesses 4 and between the lips or lugs 5 to form calks for the body. The sides of the blocks 7 are tapered or beveled, as shown at 7' in Fig. 6, to enable the lips when pressed thereagainst to firmly hold such blocks or calks to the body. The abrupt shoulders 8 at the inner and outer ends of the blocks 7 serve to dig into the surface over which the vehicle may be passing to prevent a lateral slipping thereof, while the sharp angles at the side edges of the blocks give them the necessary gripping action in a straight forward or backward running of the vehicle.

In the manufacture of the bars 1 they are preferably but not necessarily, drop forged with the shanks 6 and calk blocks 7 projecting from the body 2 thereof as shown at the left of Fig. 3. The ends are next bent to partially close the eyes 9, as indicated at the right of Fig. 3, to enable the links or chains 10 to be placed in engagement therewith, after which the blocks 7 are pressed down upon the body 1 over the recesses 4 and between the lips 5, being firmly held in such position by a compression or clenching of such lips against the tapered sides thereof.

The provision of the noise-deadening recesses 4 beneath the calks 7 is found to be quite an important feature in devices of this class, as it materially lessens the noise due to the use thereof, thus obviating to a considerable extent one of the principal objections and causes of annoyance incident to the use of devices of this character. To avoid a dead air space within such recesses the upper surface of the body 2 is preferably notched as at 11, to provide communication between the recesses and the associated eyes 9. It will be noted that the calks or blocks 7 project outwardly beyond the ends of the body 2, thus providing a broadened gripping surface, and also that the eyes 9 are disposed short of the outer ends of such calks whereby to avoid protruding parts and surplus metal, and to protect the chain or securing member 10 from injury. The securing members 10 are shown as extending inwardly at the side of the tire and connecting to holding chains 12 at the sides of the wheel-rim, as is common with devices of this class.

I wish it understood that my invention is not limited to any specific construction or arrangement of the parts except in so far as such limitations are specified in the claims.

Having thus described my invention, what I claim as new and desire to secure by Letters Patent, is,—

1. A device of the class described, comprising a body part having recesses in the outer surface thereof adjacent its ends, and calks carried by the body part over such recesses.

2. A device of the class described, comprising a bar adapted to fit to the tread of a tire, and calks carried in spaced relation by such bar, said bar and calks coöperating to form closed noise deadening cavities.

3. A device of the class described, comprising a body part having cavities in its outer face and integral projections at its ends which are bent over and rest upon the body at the margin of the cavities and form calks for the body.

4. A device of the class described, comprising a body part having projections at its ends terminating in flat blocks, such projections being bent to permit said blocks to rest firmly upon the body in spaced relation to form calks.

5. A device of the class described, comprising a body part having shanks projecting from its ends and terminating in blocks, said shanks being bent to form coöperating securing eyes and to position such blocks immediately above the end portions of the body part to form calks.

6. A device of the class described, comprising a body part having a flat outer surface and having reduced shanks projecting from its ends and terminating in blocks, said shanks being bent to enable such blocks to rest upon the end portions of the outer surface of the body part to form calks with their inner ends spaced.

7. A device of the class described, comprising a body part having projections at its ends, the terminals of which are bent over upon such body part to form calks, and means projecting from the body part and coöperating with the sides of the calks to rigidly secure them to the body part.

8. A device of the class described, comprising a body part having projections at its ends, the terminals of which are bent over upon the end portions of the body part in spaced relation to each other to form calks, said terminals having abrupt shoulders at their end portions.

9. A device of the class described, comprising a body part having projections at its ends, the terminals of which are bent over upon the end portions of the body part to form calks, said terminals having their outer surfaces flat and terminating at either end in abrupt shoulders and their side edges beveled, and means carried by the body and coöperating with the beveled side edges of the projection to rigidly secure them to the body part.

10. A device of the class described, comprising a body part having recesses in its outer surface and projections at its ends, the terminals of which are bent upon the body part over such recesses to form calks for the body part.

11. A device of the class described, comprising a body part having its outer surface flattened and its inner surface fashioned to conform to the surface of an article on which it is to rest, said body part having projections at its ends which terminate in blocks and are bent over upon the end portions thereof with the blocks in flat contact therewith whereby to form coöperating securing eyes and calks for the body part.

12. A device of the class described, comprising a body part having its outer surface provided with recesses and having projections at its ends which are bent over upon the end portions of the body to form coöperating securing eyes and calks therefor, said calks being disposed over said recesses, and means for rigidly securing the calks to the body part.

In testimony whereof, I have hereunto signed my name to this specification in the presence of two subscribing witnesses.

FRANK KALTENBACH.

Witnesses:
 G. C. REESE,
 D. L. MIZNER.